Sept. 2, 1941.   C. G. JOA   2,254,290
CONVEYER MECHANISM
Original Filed Oct. 30, 1937
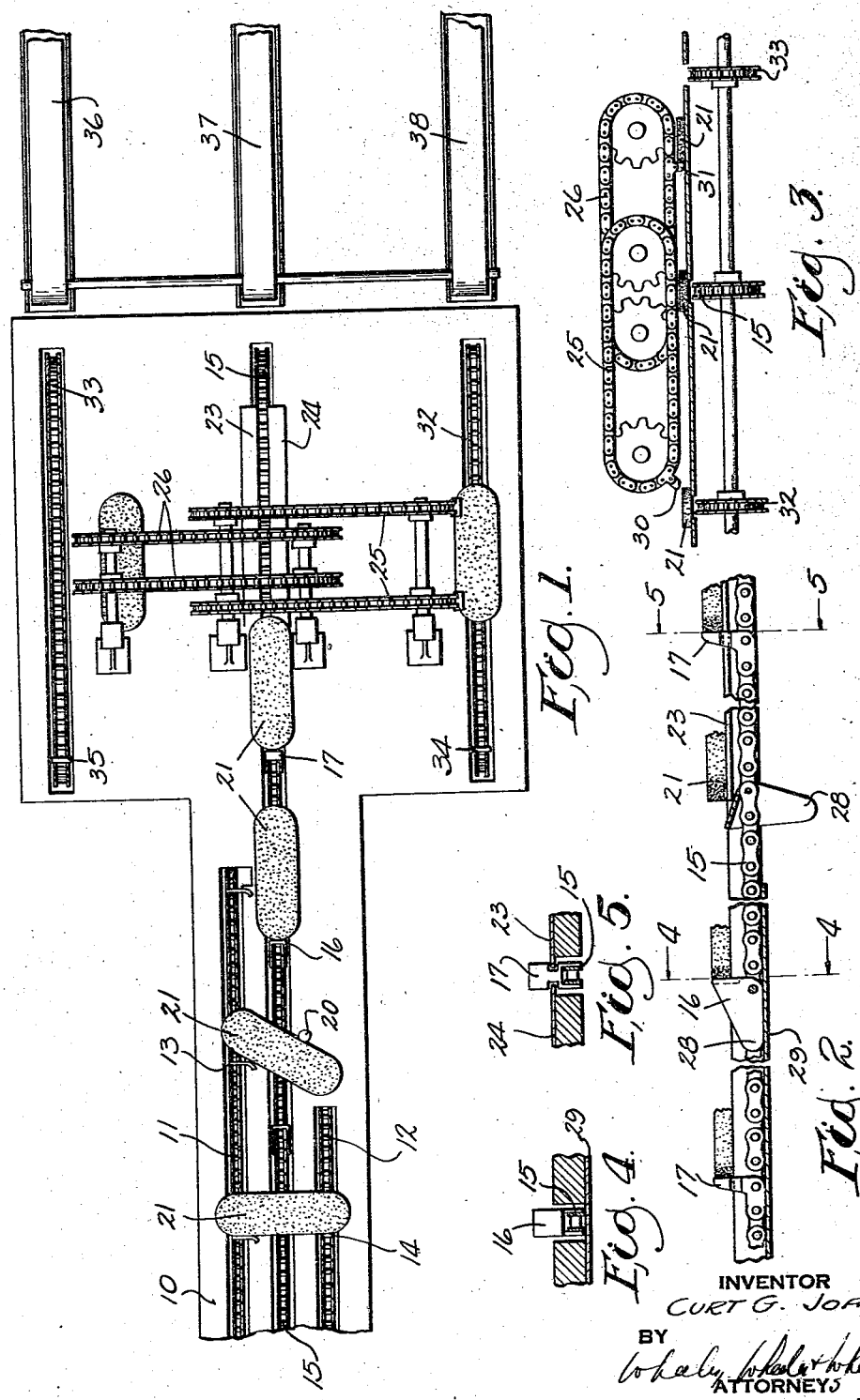
INVENTOR
CURT G. JOA
BY
ATTORNEYS Patented Sept. 2, 1941

2,254,290

UNITED STATES PATENT OFFICE 2,254,290

CONVEYER MECHANISM

Curt G. Joa, Sheboygan Falls, Wis., assignor to Curt G. Joa, Inc., Sheboygan Falls, Wis., a corporation of Wisconsin Original application October 30, 1937, Serial No. 171,861. Divided and this application February 7, 1940, Serial No. 317,645

7 Claims. (Cl. 198—20)

This invention relates to improvements in conveyer systems and the like, the present application being a division of my application entitled Manufacture of sanitary napkins and the like, Serial No. 171,861, filed October 30, 1937.

It is a primary object of the present invention to provide for greatly accelerating the output of machines regardless of the specific type of article produced thereby.

More specificaly stated, it is the object of my invention to provide an improved conveyer mechanism which is particularly adapted for use in the manufacture of sanitary napkins but is useful elsewhere to divide and distribute the output of a machine.

Other objects will appear from the following disclosure and appended claims. The drawing is largely diagrammatic but includes considerable detail. It will become apparent that considerable change in structure may be made without departing from the spirit and scope of my invention, as shown.

In the drawing:

Fig. 1 is an enlarged detail view in plan showing the portion of the feed and distributing table.

Fig. 2 is a detail view in longitudinal section through the feed and distributing table.

Fig. 3 is a view in transverse section through the feed and distributing table.

Fig. 4 is a detail view taken in section on line 4—4 of Fig. 2.

Fig. 5 is a detail view taken in section on the line 5—5 of Fig. 2.

Like parts are identified by the same reference characters throughout the several views.

In the manufacture of sanitary napkins it is possible to blank out pads at least three times as rapidly as they can be incorporated in wrappers. It is the function of the present mechanism to serve a plurality of assembly lines from a single pad blanking mechanism not shown. The assembly lines are adapted to operate the units to function concurrently on the adjacent napkins to deliver three completed napkins simultaneously at the end of the machine for discharge into a common stacker. The conveyer mechanism herein described is adapted for cooperation with a pad blanking mechanism and an assembly mechanism and stacker in a manner illustrated in my co-pending application, Serial No. 171,861. Thus, there is one web or composite web of pad material going into one end of the machine, one series of completed napkins discharged from the other end in stacks, but the intervening portion of the machine is divided into a plurality of assembly lines so that it can operate much more slowly than the input or discharge portion of the mechanism, thereby doing more accurate work with less danger of spoilage, while at the same time enormously increasing the output of the machine. The arrangement is such that the machine takes a little more space than the single assembly line machine as heretofore made. The apparatus herein described is adapted to convey the blanks from the blank cutting mechanism and properly feed them to a plurality of assembly lines.

The principle of the conveyer or distribution mechanism being thus broadly stated, I shall now describe my invention in more detail, it being understood that reference to a sanitary napkin machine is merely illustrative of the principle.

As the successive articles are discharged from the blanking die, they fall upon table 10, Fig. 1, in the path of conveyer chains 11 and 12 which carry aligned lugs 13 and 14 for propelling the articles. Each article is arranged to span an intervening conveyer chain 15 having two types of lugs at 16 and 17, respectively. Between each pair of consecutive lugs 17, there will intervene a number of lugs 16 corresponding to the number of assembly lines. The several lugs 16 and 17 are otherwise equally spaced along the conveyer chain 15 to alternate with the position of lugs 13 and 14 upon chains 11 and 12.

It will be noted that the conveyer chain 12 ends near the lefthand side of Fig. 1. Conveyer chain 11 is carried somewhat farther along the table 10. Central chain 15 continues to the end of the table. Shortly beyond the end of conveyer chain 12, I provide a fixed peg at 20 positioned to engage the side of one of the articles 21 to bring that side of the article to rest. During the continued movement of the conveyer chain 11, its lug 13, engaging the other side of the article, will cause the article to turn as indicated in Fig. 1. Ultimately, the space between lug 13 and peg 20 being substantially equal to the width of the article, the article will be aligned longitudinally with conveyer chain 15 to be engaged on one of the lugs thereof.

The notched lugs 17 are fixed to conveyer chain 15 as shown in Fig. 2. The article engaged by said lug will be propelled continuously across the table 10 and discharged from the end thereof. The notches in the side of the lug enable the lug to pass the closely spaced plates at 23 and 24, Fig. 5, beneath the cross conveyers 25 and 26, respectively. Lugs 16 on chain 15, on the other hand, are pivoted on the chain and carry tail pieces 28 which act as weights. Throughout the majority of the length of the feed table 10, these tail pieces ride on the support 29, Figs. 2 and 4. This support holds the lug upright in effective position. Shortly before the plates 23 and 24 are encountered, however, the support 29 terminates. As shown in Fig. 2, this allows the tail piece 28 to drop, a pivotal oscillatory movement of the lug being assured by engagement of its unnotched sides with plates 23 and 24. This leaves the article propelled by that lug stationary on plates 23 and 24 in a position to be removed toward one side or the other by the cross conveyers 25 or 26.

The cross conveyers 25 and 26 carry propeller lugs 30 and 31, respectively. In Fig. 3, one of the articles 21 has been delivered to the left, another has been delivered to the right, and a third is just being propelled by one of the notched lugs 17 down the center of the feed table.

Operating in synchronism with the central feed chain 15 are two side feed chains 32 and 33. Each of these chains preferably has a feed lug or lugs 34, 35 at such spacing that they will move along the feed table in exact synchronism with one of the notched lugs 17 of the central conveyer chain. Thus, after one article has been delivered to one side of the feed table and one article to the other, these two articles will be picked up to resume their lengthwise movement in step to the advance of the third article along the center of the feed table. Thereafter the operation is repeated. From this point there are three assembly lines designated by figures 36, 37 and 38, as described in detail and claimed in my co-pending application Serial No. 171,861.

I claim:

1. In a conveyer mechanism, the combination with means providing a transfer station, of a plurality of separate conveyers for delivering articles from said station and an intermediate feeding conveyer leading to said station between said first mentioned conveyers and including means for feeding a succession of articles at predetermined intervals, a plurality of cross conveyers operating at said station from said feeding conveyer to the respective delivery conveyers and provided with propelling means so spaced as to engage different articles fed to said station by said feeding conveyer, whereby successive articles so fed are transferred to the respective delivery conveyers.

2. In a conveyer mechanism, the combination with a first article conveyer provided with a plurality of types of article propelling means, one such type of article propelling means being adapted to discontinue article propulsion at a predetermined station and another such means being adapted to continue article propulsion beyond said station, of a cross conveyer at said station provided with means for laterally impelling an article coming to rest at said station, and separate article conveying systems including advancing means supplied by said first conveyer and cross conveyer respectively.

3. In an assembly machine, the combination with a first conveyer having one type of pad propelling means adapted to discontinue pad propulsion at a predetermined station and another type of pad propelling means adapted to continue pad propulsion beyond said station, of a plurality of cross conveyers acting oppositely at said station for the lateral propulsion in opposite directions of pads coming to rest at said station, and means consisting of a plurality of article conveying lines each adapted to receive pads from one of the several conveyers aforesaid.

4. In a device of the character described, the combination with a distributing table, of a plurality of cross conveyers acting transversely across the face of the table at a predetermined station thereon, a plurality of longitudinal conveyers acting in spaced relation past said station, each of the several conveyers including article propelling lugs for advancing articles longitudinally or laterally across the face of the distributing table, the lugs of one of the longitudinal conveyers including one type of lug fixed to the conveyer for continuous article propulsion past said station, and a foldable lug intervening between lugs of the first type and adapted to release at said station the articles propelled by it, whereby said articles will come to rest at said station to be propelled by the lugs of one of said cross conveyers.

5. In an article assembling machine, the combination with a slotted distributing table having a distributing station, of a conveyer operating in a slot of said table and provided with widely spaced pad propelling lugs fixed to the conveyer for continuous propulsion of pads across said station, said conveyer being also provided with intervening lugs downwardly yieldable to pass beneath said table at said station, whereby to release at said station the pads propelled thereby, together with means for removing laterally at said station pads propelled by said last mentioned lugs and coming to rest at said station.

6. In an assembly machine, the combination with a conveyer chain provided at intervals with pad propelling lugs fixed thereto and transversely slotted at their margins, a distributing table having a channel in which said chain operates and provided at a distributing station with plates receivable in the slotted margins of said lugs, sets of additional propelling lugs pivotally mounted on said chain between said first mentioned lugs and having unslotted margins adapted to be engaged by said plates for the pivoting of said lugs to inoperative positions upon said chain, whereby to permit pads propelled by said last mentioned lugs to come to rest on said plates at said station, means for maintaining said last mentioned lugs normally erect in pad propelling positions while permitting said lugs to collapse to inoperative positions on approaching said plates, and cross conveyer means for removing laterally over said table from said plates the pads that come to rest thereon at said station.

7. In an article assembling machine, the combination with a conveyer chain provided at intervals with pad propelling lugs fixed thereto and transversely slotted at their margins, a distributing table having a channel in which said chain operates and provided at a distributing station with plates receivable in the slotted margins of said lugs, sets of additional propelling lugs pivotally mounted on said chain between said first mentioned lugs and having unslotted margins adapted to be engaged by said plates for the pivoting of said lugs to inoperative positions upon said chain, whereby to permit pads propelled by said last mentioned lugs to come to rest on said plates at said station, means for maintaining said last mentioned lugs normally erect in pad propelling positions while permitting said lugs to collapse to inoperative positions on approaching said plates, and cross conveyer means for removing laterally over said table from said plates the pads that come to rest thereon at said station, together with a plurality of separate conveyer systems operatively positioned to receive separate pads from said first conveyer and said cross conveyer means respectively.

CURT G. JOA.